United States Patent Office 3,679,668
Patented July 25, 1972

3,679,668
1,2,4-TRIAZOLYL-(1)-DERIVATIVES OF THE STILBENE AND BIS-STYRYLBENZENE SERIES, PROCESS FOR THEIR MANUFACTURE AND THEIR USE AS OPTICAL BRIGHTENERS
Anton Horn, Kelkheim, Taunus, Erich Schinzel, Hofheim, Taunus, and Gunter Rosch, Altenhain, Taunus, Germany, assignors to Farbwerke Hoechst Aktiengesellschaft vormals Meister Lucius & Bruning, Frankfurt am Main, Germany
No Drawing. Filed Apr. 13, 1970, Ser. No. 28,105
Claims priority, application Germany, Apr. 16, 1969, P 19 19 209.7; Mar. 13, 1970, P 20 11 916.8
Int. Cl. C07d 99/02
U.S. Cl. 260—240 CA                11 Claims

ABSTRACT OF THE DISCLOSURE 1,2,4-triazolyl-(1)-derivatives of the stilbene and bis-styrylbenzene series are obtained by condensation of the corresponding phenylhydrazines with formamide. The products are useful as optical brighteners for various substrates.

---

The present invention relates to new derivatives of the 1,2,4-triazolyl-(1)-stilbene and bis-styryl-benzene series. A further object of this invention is the preparation of these new compounds by condensation of the corresponding phenylhydrazines and formamide. Still a further object is the use of the new triazoles as optical brighteners for various substrates and a process for the optical brightening of fibrous materials which comprises contacting the substrate with said triazoles. Still further objects will appear to anyone skilled in the art from the following disclosure.

In German patent specification No. 1,008,248 brighteners of the stilbene series containing 1,2,3-triazolyl-1-radicals are disclosed which compounds are prepared by 1,3-dipolar addition of acetylene compounds onto azides. Pellizzari and Massa (G. 26,II,419,429) have shown that 1-phenyl-1,2,4-triazol and 1-phenyl-1,2,4-triazols substituted in the phenyl nucleus can be obtained by reaction of the corresponding phenyl hydrazines with formamide.

In contradistinction thereto, the present invention concerns compounds of the general Formula I in which Z and $Z_1$ each represent a hydrogen atom, a sulfonic acid or carboxylic acid group or the functional derivatives thereof, $n$ is 1 or 2, A stands for a hydrogen or halogen atom, a lower alkoxy, cyano, carboxy or carboxylic acid ester group, and optionally, substituted carboxylic acid amide group, an —NH—COR— group in which R is a lower alkyl group or an optionally substituted phenyl group, or a group of the formula

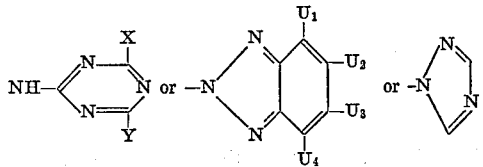

in which X and Y each stand for a chlorine atom, the —$NH_2$— group, a lower alkoxy group or the radical of a primary or secondary aliphatic, aromatic or saturated heterocyclic amine, $U_1$ and $U_4$ each stand for a hydrogen atom, a group of the formula $CO_2Me$ in which Me is a hydrogen atom or a cation, $U_2$ stands for a hydrogen atom, a lower alkyl or lower alkoxy group, $U_3$ for a lower alkyl or lower alkoxy group and $U_2$ and $U_3$ together for a methylene-dioxy group and $U_2$ or $U_3$ and $U_1$ or $U_4$ together stand for an annulated benzene ring substituted by one or more groups of the formula $SO_3Me$ in which Me has the meaning given above or the quaternization products thereof.

The invention likewise provides a process for the manufacture of the said compounds which comprises:
(a) tetrazotizing a diamine of the general Formula II

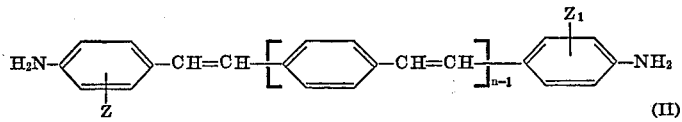

wherein Z, $Z_1$ and $n$ are defined as above, reducing the tetrazonium salts obtained to yield bishydrazines of the Formula III

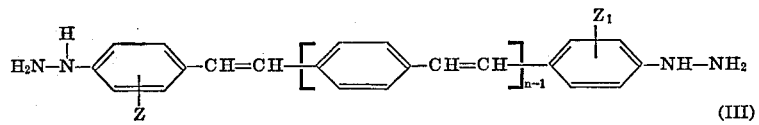

wherein Z, $Z_1$ and $n$ are as defined above and heating the dried bishydrazines with the threefold to tenfold, preferably five- to six-fold amount by weight of formamide to temperatures from about 150 to about 200° C., preferably about 185 to about 195° C. and, optionally, transforming the bis-[1,2,4-triazolyl-(1)-] compounds of the Formula I, in which Z and $Z_1$ are sulfonic or carboxylic acid groups, after their conversion into sulfonic or carboxylic acid chlorides, into the corresponding esters or, respectively, substituted amides, or quaternizing the said compounds, or

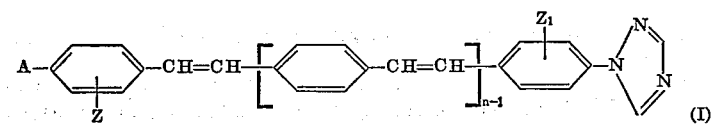

(b) diazotizing nitro-amines of the general Formula IV

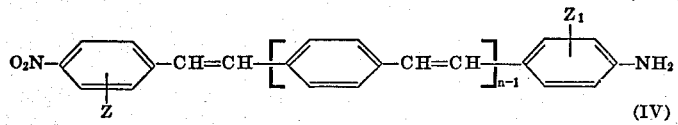

in which Z, $Z_1$ and $n$ have the meanings defined above, reducing the diazonium salt obtained to yield amino-hydrazines of the Formula V

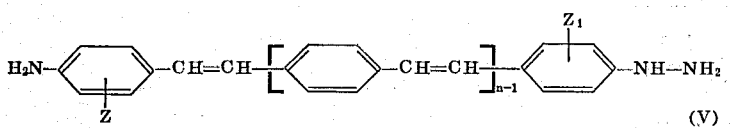

in which Z, $Z_1$ and $n$ have the meanings defined above, and heating the dried amino-hydrazines with a threefold to tenfold, preferably five- to sixfold amount by weight of formamide to temperatures from about 150 to about 200° C., preferably about 185 to about 195° C. and diazotizing the 1,2,4-triazolo-amino compounds obtained of the Formula VI

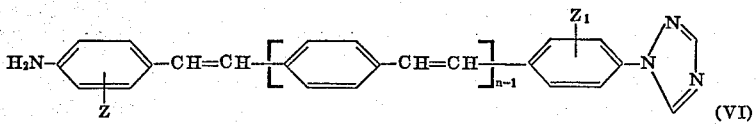

in which Z, $Z_1$ and $n$ have the meanings given above, replacing the diazonium group by a hydrogen or halogen atom, a lower alkoxy or cyano group which, optionally, is transformed into a carboxylic or carboxylic acid ester group or an, optionally, substituted carboxylic acid amide group, or coupling the diazonium salts resulting from the compounds of Formula VI onto an aromatic amine coupling in o-position to the amino group and triazolizing the o-amino-azo compounds of the Formula VII

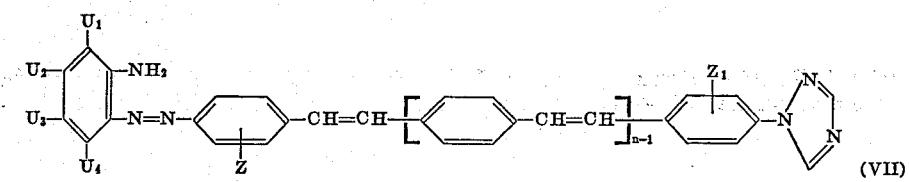

thus formed wherein $U_1$, $U_2$, $U_3$, $U_4$, Z, $Z_1$ and $n$ are as defined above, with oxidizing agents, preferably in aqueous suspension at temperatures of from about 50° to about 100° C., preferably about 70 to about 90° C. or reacting the 1,2,4-triazolamines of the Formula VI with lower aliphatic or, optionally substituted, aromatic carboxylic acid chlorides or reacting them with 1 mol of cyanuric acid chloride and, optionally, transforming the reaction product of Formula VIII

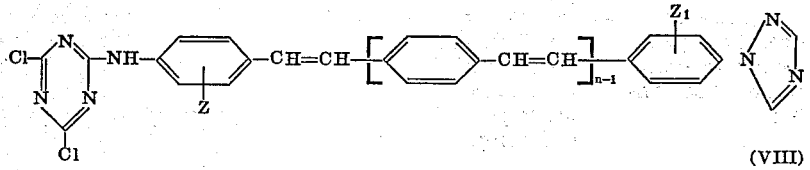

in which Z, $Z_1$ and $n$ are as defined above, with lower alcohols, primary or secondary aliphatic or aromatic amines or saturated heterocyclic amines or ammonia and, if desired, quaternizing, subsequently, said compound.

In the following some preferred variants of carrying out the afore-mentioned reactions are described:

For tetrazotizing the diamines of Formula II in which Z and $Z_1$ stand for a sulfonic or carboxylic acid group, said diamines are converted into their soluble alkali-metal salts, are mixed with the calculated amount of sodium nitrite and the solutions are allowed to run into an excess of cooled hydrochloric acid, a possible excess of nitrite being removed by means of amidosulfonic acid. To the suspension of the tetrazonium salts that precipitates as fine crystals a reading agent for example an alkali metal sulfite or zinc is added while cooling to 0–5° C.; preferably a solution of the calculated amount of $SnCl_2$ in concentrated hydrochloric acid (2 mols of $SnCl_2$ for each group of diazonium salt) is dropwise added until no diazonium salt can be detected any more by means of a coupling test. The batch is stirred at room temperature for several hours to be, subsequently, heated to the boil for about 15 minutes. On cooling, the bis-hydrazines of Formula III crystallize. They are suction-filtered, are freed from the tin salts by washing with 4-N-hydrochloric acid, are washed neutral and dried. The dry compounds of Formula III are placed into a fivefold amount by weight of formamide, heated to 185–195° C. with stirring at which temperature the batch is maintained for one hour. The excess of formamide is removed in vacuo, the solid residue dissolved in water and the reaction products are precipitated, by addition of sodium chloride, as sodium salts or, by addition of mineral acid, as free acids or, respectively, inner salts (betaines).

On diazotizing the nitro-amino compounds of Formula IV in which Z and $Z_1$ stand for a sulfonic or carboxylic acid group, an analogous procedure is followed as in tetrazotizing the compounds of II. Reduction of the nitro-diazonium salts is effected in known manner, at 0–5° C., using a solution of the calculated amount of reducing agent, preferably $SnCl_2$ in concentrated hydrochloric acid (2 mols of $SnCl_2$ for each mol of diazonium salt, 3 mols of $SnCl_2$ for each nitro group). The aminohydrazines of Formula V, crystallizing on cooling are suction filtered, optionally washed with 4-N-hydrochloric acid to be freed from the tin salts, are washed neutral and dried.

The dry amino-hydrazines of Formula V are placed into about the fivefold amount by weight of formamide, heated, while stirred, to 185–195° C. at which temperature the batch is maintained for one hour. The excessive formamide is removed in vacuo, the solid residue dissolved in dilute alkali hydroxide solution and stirred for one hour at 80° C. (The heating in an alkaline solution is necessary in order to hydrolyze the formamidine resulting on heating a primary amino group with formamide.)

After cooling, the reaction products of Formula VI are isolated as free acids or inner salts (betaines).

In order to prepare the diazonium salt of the compounds of Formula VI these latter are transformed into their soluble alkali-metal salts, mixed with the calculated amount of sodium nitrite and are allowed to run into an excess of cooled hydrochloric acid.

The diazonium salts obtained are reacted in known manner by replacing the diazonium group by a hydrogen or halogen atom, a lower alkoxy group or cyano group which is optionally further converted or are coupled onto an aromatic amine of Formula IX

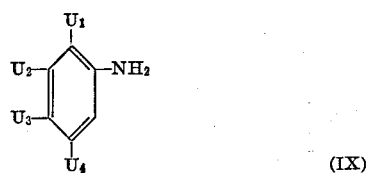

(IX)

in which $U_1$, $U_2$, $U_3$ and $U_4$ have the meanings identified above, which couples in o-position to the amino group.

Coupling is performed at 0–5° C. while maintaining a pH between about 3 and 7, preferably between 5.5 and 6. For this purpose, the amines of Formula IX containing solubilizing groups are employed as aqueous solutions, whereas the water-insoluble amines are reacted in organic solvents such as pyridine or dimethylformamide.

In general, the o-amino-azo dyestuffs obtained having the Formula VII can be separated by adding 100 g. of sodium chloride per litre of solution.

The o-amino-azo dyestuffs separated by suction-filtration are washed, thoroughly, with dilute sodium chloride solution and triazolized, at 50–100° C., preferably 70–80° C., in known manner, without intermediate drying, in aqueous suspension, at a pH of about 9, by means of oxidizing agents such as copper —(II)— salts or air, preferably hypochlorites, for example excessive sodium hypochlorite.

The so-obtained compounds of Formula I wherein Z and $Z_1$ stand for a sulfonic acid or carboxylic acid group and A stands for

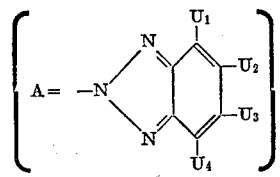

which show a faintly yellow coloration are, after addition of sodium chloride, suction-filtered, washed and purified by reprecipitating several times from water or from a mixture of dimethylformamide and water.

In order to prepare the acylation products of the amines of Formula VI in which Z and $Z_1$ stand for a sulfonic acid or carboxylic acid group, the salts of said amines are reacted in hydrous-acetonic solution with acid anhydrides or acid halides of lower aliphatic or, optionally, substituted aromatic carboxylic acids while maintaining the reaction medium weakly acid (at a pH of about 3) with sodium carbonate solution.

For preparing the s-triazinyl-derivatives one mol of cyanuric chloride is introduced in known manner into a hydrous-acetonic suspension and is reacted at 0 to 5° C., with 1 mol of an amine of Formula VI in the form of the soluble alkali-metal salt, at a weakly congo-acid reaction.

In the so-obtained dichlorotriazinyl compounds (VIII) a further chlorine atom can be replaced, at about 40° C. and a pH of about 7, by the radical of a primary or secondary aliphatic or aromatic amine or by an alcohol radical. The third chlorine atom can be replaced at a temperature near the boiling point of water using an excess of the said amines.

As diamines of the general Formula II, there may for example be used the following compounds or derivatives thereof, for instance, salts, preferably an alkali-metal, alkaline-earth metal or ammonium salt, esters or amides:

4,4'-diaminostilbene-2,2'-disulfonic acid,
4,4'-diaminostilbene,
4,4'-diaminostilbene-2-sulfonic acid,
4,4'-diaminostilbene-2-carboxylic acid,
1,4'-bis-[4'-amino-2'-sulfo-styryl-]- benzene or
1,4-bis-[4'-amino-2'-carboxy-styryl-]- benzene.

As nitro amines of the general Formula IV for example the following may serve:

4-nitro-4'-amino-stilbene-2,2'-disulfonic acid,
4-nitro-4'-amino-stilbene-2-sulfonic acid,
4-nitro-4'-nitro-4'-amino-stilbene-2-carboxylic acid or
1-[-4'-nitro-2'-sulfo-styryl]-4-[4''-amino-2''sulfostyryl]- benzene.

As a starting substance especially suitable for the preparation of the compounds of the invention and readily accessible there may be mentioned in particular 4-nitro-4'-amino-stilbene-2,2'-disulfonic acid.

As aromatic amines of Formula IX there may, for example, be named:

2-amino-naphthalene,
2-amino-naphthalene-3-carboxylic acid,
2-amino-naphthalene-5-sulfonic acid,
2-aminonaphthalene-6-sulfonic acid,
2-amino-naphthalene-5,7-disulfonic acid,
4-amino-2-methoxy-toluene,
3,4-dimethoxy-aniline (4-amino-veratrol) or
3,4-methylene-dioxy-aniline.

As lower aliphatic or, optionally substituted, aromatic carboxylic acids used as acid chlorides or acid anhydrides for the acylation of the amines of Formula VI are cited by way of example: acetic acid, benzoic acid, alkoxy-benzoic acids such as 4-methoxy-benzoic acid, 2,4-dimethoxy-benzoic or phenylacetic acid.

Primary or secondary lower aliphatic or aromatic amines suitable for further reacting the dichlorotriazinyls of Formula VIII are, for example: dimethylamine, ethylamine, ethanolamine, diethanolamine, piperidine, morpholine, aniline, tolidine, xylidine, sulfanilic acid, metanilic acid.

Also compounds of the invention which are free from solubilizing groups, especially those of the Formula X

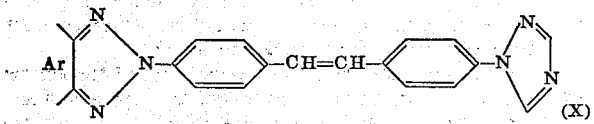

wherein Ar stands for a mononuclear or polynuclear arylene group which together with two vicinal carbon atoms is part of a 1,2,3-triazolyl ring, preferably a radical of the benzene or naphthalene series, containing, optionally, lower alkyl or lower alkoxy groups or lower alkylene groups that are closed to an annulated ring can be transformed into the preferred water-soluble form by conversion with a quaternizing agent of the general formula

in which R' is a lower alkyl group and An the radical of a colorless anion, at about 100 to about 250° C., preferably about 150°–250° C., preferably in an inert organic solvent, into compounds of the general Formula XII

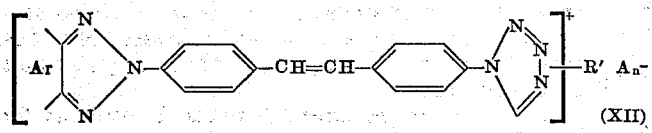

As quaternizing agents there may, for example, be employed: alkylhalides such as methylchloride, methylbromide, ethylchloride, ethylbromide, propylbromide or n-butylbromide, aralkylhalides, such as benzylchloride or benzylbromide, moreover sulfuric acid esters or arylsulfonic acid esters, e.g. dimethylsulfate, diethylsulfate, benzenesulfonic acid methylester, toluenesulfonic acid methylester or toluenesulfonic acid ethylester.

As inert organic solvents there may serve, for example: o-dichlorobenzene, 1,2,4-trichlorobenzene, mixtures of trichlorobenzenes, α-methylnaphthalene and α-chloronaphthalene.

When dissolved, the compounds of the invention have a more or less pronounced fluorescence and are suitable for the optical brightening of various organic substrates. Good results are, for example, achieved in the brightening of lacquers or of synthetic fibres, for example, of those made from acetyl cellulose, polyesters, polyolefins, polyvinylchloride, polyvinylidenechloride, as well as in the brightening of films, foils, bands or shaped structures consisting of said materials. The water-soluble compounds of the invention are highly suitable for the optical brightening of native or regenerated cellulose fibres, wool and, more especially, synthetic polyamide fibres. They show on the substrates mentioned excellent brightening effects; and are applied on wool and polyamide fibres, preferably, in the acidic range at pH values between 3 and 6. On cellulose fibres the brilliance of the white shades obtained can still be further increased by addition of electrolytes.

The compounds of the invention are stable in bleaching liquors of sodium chlorite and provide, when used in conjunction with sodium chlorite as bleaching agent, on cellulose or polyamide fibres, excellent bleaching effects. They may be applied both at temperatures below the boiling point of water or at so-called high-temperature conditions.

The quaternized compounds are suitable for the optical brightening of the most various organic substrates, in particular of polyacrylonitrile and copolymers thereof, more especially, of those containing, at least, 85% of polyacrylonitrile. The compounds of the invention exhibit on said substrates excellent bleaching effects. They are applied to polyacrylonitrile fibres, preferably, in the acid range, at pH values between about 2 and 6, especially about 3 and 4.

The quaternized compounds are likewise stable in bleaching liquors containing sodium chlorite. In using them, it is possible, when employing concomitantly, sodium chlorite as bleaching agent, to achieve on polyacrylonitrile fibres remarkable bleaching effects. They may be applied both at temperatures below the boiling point of water and at higher temperatures ("HT conditions").

Those compounds of the invention which are insoluble in water may also be used in solution in organic solvents or aqueous dispersions, preferably in conjunction with a dispersing agents. As dispersing agents there may be employed, for example: soaps, polyglycol ethers of fatty alcohols, fatty amines or alkylphenols, cellulose sulfite waste liquors or condensation products of, optionally, alkylated naphthalene-sulfonic acids and formaldehyde.

Moreover, the products of the invention may be added to high molecular organic substrates prior to or during the moulding. They can thus be introduced in the manufacture of films, foils, bands or shaped structures, into the moulding materials, or be dissolved in the spinning solution prior to spinning. Suitable compounds can also be added to the low molecular starting materials prior to polycondensation as in the case of polyamide-6,6 or before polymerization.

The amount of compound of Formula I referred to the substrate to be optically brightened which is to be used according to the invention may vary within wide limits. This amount can be easily determined by a preliminary test. In general, it will be in the range of from 0.01 to 2%.

The compounds of the present invention can likewise be used in mixture with dyestuffs, chemical bleaching agents, finishing, softening, washing or after-treating agents for laundered materials.

The following examples and tables are to illustrate the invention. The parts and percentages are by weight unless otherwise stated.

EXAMPLE 1

The sodium salt of 4-[1'',2'',4''-triazolyl-(1'')]-4'-aminostilbene-2,2'-disulfonic acid serving as starting material for the manufacture of a number of products of the invention was obtained as follows:

A solution of 44.4 parts of the sodium salt of 4-nitro-4'-amino-stilbene-2,2'-disulfonic acid in 700 parts by volume of water was mixed with a solution of 6.9 parts of sodium nitrite in 20 parts by volume of water and was cooled to 10° C. The resulting solution was added at 5–10° C. dropwise, and, while stirring, to a mixture of 33 parts by volume of concentrated hydrochloric acid and 165 parts by volume of water. After the addition was complete, stirring was continued for one hour at 5–10° C., whereupon the excess of nitrous acid was removed with amidosulfonic acid.

While continuing the stirring and cooling to 5–10° C., subsequently, a solution of 113 parts of tin-(II)-chloride-dihydrate in 226 parts by volume of concentrated hydrochloric acid was allowed to run into the reaction mixture which was stirred at the said temperature until no coupling reaction was detected.

Then, the reaction mixture was stirred for 14 hours at room temperature to be, finally, heated for another hour, to the boil. Subsequently, the mixture was allowed to cool slowly, to room temperature and was stirred for one hour, with cooling, on the ice bath. Subsequently, it was suction-filtered, the filtrate was washed, first with 4 N hydrochloric acid and then with dilute sodium chloride solution. After drying, the 4-hydrazino-4'-amino-stilbene-2,2'-disulfonic acid was obtained as a finely crystalline yellow-brown powder.

38.5 parts of 4-amino-4'-hydrazino-stilbene-2,2'-disulfonic acid were run, at room temperature, while stirring, into 200 parts of formamide. The well-stirred suspension was, subsequently, heated for one hour to 186° C. (reflux temperature of formamide). The reaction mixture was allowed to cool, slowly, to room temperature and the formamide was distilled off in vacuo. The evaporation residue was dissolved, while heated to 80° C., in 800 parts by volume of water, was clarified with 3 g. of charcoal and was salted out, at 60° C., with 80 parts of sodium chloride. The whole was stirred for a short time at said temperature, allowed to cool to room temperature without stirring, and stirred for one hour on the ice bath. Then the product was suction-filtered and washed with a cold sodium chloride solution of 10% strength. The filter-cake was dissolved in 800 parts by volume of 1-N sodium hydroxide solution and was stirred for one hour at 80° C. After salting out at 60° C. with 80 parts of sodium chloride, cooling, suction-filtration and drying, the sodium salt of 4-[1",2",4"-triazolyl-(1")-]-4 aminostilbene-2,2'- disulfonic acid was obtained as a finely crystalline yellow powder.

EXAMPLE 2

The sodium salt of 4-[1",2",4"-triazolyl-(1")]-4'-benzoylamino-stilbene-2,2'-disulfonic acid (No. 2, Table 1) was obtained as follows:

A solution of 46.6 parts of the sodium salt of 4-[1",2",4"-triazolyl-(1")]-4'-amino - stilbene - 2,2' - disulfonic acid in 750 parts by volume of water was added, at 5–10° C., dropwise and while stirring, to a solution of 15.4 parts of benzoylchloride in 250 parts by volume of acetone. The reaction was maintained weakly acid by simultaneous addition of 4-N sodium carbonate solution (pH about 3). The addition being terminated, the batch was stirred for another two hours at 10° C., after which period no more free amine could be detected. On completion of the reaction, the mixture was neutralized with 4-N sodium carbonate solution (pH about 7), the acetone was distilled off and replaced by an equal volume of water. The aqueous solution was heated to 70° C., clarified with charcoal and, at 60° C., 75 parts of sodium chloride were stirred into the clear solution. The whole was allowed to cool to room temperature without stirring, the product was suction filtered and washed with dilute sodium chloride solution.

For purification, the filter-cake was added in portions and while stirring, to a mixture of 900 parts by volume of methanol and 30 parts by volume of concentrated hydrochloric acid. Stirring was continued for five hours at room temperature, the product was suction filtered and was washed with methanol. The filter-cake was dissolved in 800 parts by volume of water by heating to 60° C. and neutralizing with 4-N sodium carbonate solution and the product salted out with 80 parts of sodium chloride. The whole was allowed to cool, the product was suction filtered and was dried. Thus, the sodium salt of 4-[1",2",4" - triazolyl - (1")] - 4' - benzoyl - amino - stilbene-2,2'-disulfonic acid was obtained as a faintly yellow powder.

EXAMPLE 3

The sodium salt of 4-[1",2",4"-triazolyl-(1")]-4'-[4'''-anilino - 2''' - diethanol amino - 1''',3''',5''' - triazinylamino-(6''')-]-stilbene-2,2-disulfonic acid (No. 4, Table 1) was prepared in the following manner:

18.5 parts of cyanuric choride were dissolved in 200 parts by volume of acetone and the solution was allowed to run, while stirring and cooling, to 0–2.5° C., into 300 parts by volume of water. To this well-stirred suspension there was, subsequently, added, at 0–2.5° C, dropwise, a solution of 46,6 parts of the sodium salt of 4-[1",2",4"-triazolyl-(1")-4'-amino-stilbene-2,2'-disulfonic acid in 700 parts by volume of water. Simultaneously, 4-N sodium carbonate solution was added, in order to maintain a weakly acid reaction (pH about 3). On completion of the addition, the whole was stirred for two hours at 0–2.5° C.

After that period, no free amine was detectable any more. The batch was neutralized with 4-N sodium carbonate solution (pH about 7) and at 0–2.5° C. while stirring and maintaining a neutral reaction, a solution of 9.3 parts of aniline in 30 parts by volume of acetone was introduced. Thereupon, the batch was heated first to room temperature and then, for two hours, to 40° C.

After that period, no more aniline was detected. Subsequently, a solution of 31.5 parts of diethanolamine in 100 parts by volume of water was added, the acetone was distilled off, and the solution that remained behind was heated at the boil during five hours. Then, the batch was cooled to 60° C., 110 parts of sodium chloride were introduced with stirring, the batch was allowed to cool to room temperature without stirring at which it was then stirred for five hours and for one hour on the ice bath. The product was then suction-filtered and washed with dilute sodium chloride solution. After drying, the sodium salt of 4-[1",2",4"-triazolyl-(1")-]4'-[4'''-anilino-2'''-diethanolamino - 1''',3''',5''' - triazinylamino - (6''')]-stilbene-2,2'-disulfonic acid was obtained as a faintly yellow powder.

EXAMPLE 4

An unbleached cotton fabric was treated at 80° C., for half an hour, with the twentyfold amount of a solution containing per liter: 0.6 part of sodium chlorite, formic acid for adjusting a pH of 3.5 and—referred to the weight of the goods—0.3% of the sodium salt of 4-[1",2",4" - triazolyl - (1") - ] - 4 - [5'''; - methoxy - 6''';-methyl-benzotriazolyl-(2''')-]-stilbene-2,2"-disulfonic acid (No. 7, Table 1). After washing and drying, the cotton fabric exhibited an excellent degree of whiteness of bluish fluorescence.

The sodium salt of 4-[1",2",4"-triazolyl-(1")-]-4'-[5''' - methoxy - 6''' - methyl - benzotriazolyl - 2''')-]-stilbene-2,2'-disulfonic acid (No. 7, Table 1) was prepared as follows:

46.6 parts of the sodium salt of 4-[1",2",4"-triazolyl-(1")-]-4'-amino-stilbene-2,2'-disulfonic acid were dissolved in 700 parts by volume of water, and mixed with a solution of 6.9 parts of sodium nitrite in 20 parts by volume of water and were diazotized under the conditions described in Example 1.

The suspension of the diazonium salt was added dropwise, at 5–10° C., while stirring, to a solution of 13.7 parts of 3-methoxy-p-toluidine in 700 parts by volume of aqueous 50% pyridine. Stirring was continued for one hour, whereupon the solution was rendered alkaline (pH between 10 and 11) and the pyridine was distilled off with steam. After the pyridine had been removed, the hot, alkaline solution was filtered and was mixed, at 60° C., with 324 parts of sodium chloride. The batch was allowed to cool at room temperature, was stirred for one hour on the ice bath, was suction-filtered and washed with a 20% sodium chloride solution.

The filtered azo-dyestuff was stirred into 2 l. of water and the mixture was rendered alkaline by adding 200 parts of sodium hydroxide solution of 4% strength. The whole was heated to 80° C. at which temperature 190 parts of sodium hypochlorite (containing 15% active chlorine) were portionwise added. Stirring was continued for one hour at 80° C., the reaction product was salted out, at 60° C., with 352 parts of sodium chloride, allowed to cool to room temperature without stirring, stirred for one hour on the ice bath and suction-filtered.

For purification, the so-obtained product was dissolved while heated to 80° C. in 1200 parts by volume of a mixture of dimethylformamide and water of the ratio 1:5 by volume, was clarified with charcoal and salted out, at 60° C., with 150 parts of sodium chloride, allowed to cool unstirred, to room temperature, stirred for one hour on the ice bath and dried.

Thus, the sodium salt of 4-[1",2",4"-triazolyl-(1")]-4' - [5''' - methoxy - 6''' - methyl - benzotriazolyl-(2''')]- stilbene - 2,2' - disulfonic acid was obtained as a finely crystalline light-yellow powder.

EXAMPLE 5

A knit fabric of polyamide-6,6 fibres was impregnated with a solution containing per liter 20 parts of a polyglycol having an average molecular weight of 400 and 5 parts of the sodium salt of 4-[1'',2'',4''-triazolyl-(1'')-]-4'-[6''',8''' - disulfo - naphtho - (1,2 - d) - triazolyl-(2''')-]-stilbene-2,2'-disulfonic acid (No. 12, Table 1). The thus wetted material was squeezed off between rollers until its moisture content was 60% referred to the weight of the goods and was subsequently thermosoled, at 200° C., for half an hour, by dry heat. The fabric exhibited an excellent degree of whiteness of a bluish fluorescence.

The sodium salt of 4-[1'',2'',4''-triazolyl-1''')]-4'-[6''',8''' - disulfo - (1,2 - d) - naphtho - triazolyl-(2''')-]-stilbene-2,2'-disulfonic acid (No. 12, Table 1) was prepared as follows:

46.6 parts of the sodium salt of 4-[1'',2'',4''-triazolyl-(1'')-]4'-aminostilbene-2,2'-disulfonic acid were dissolved in 700 parts by volume of water, were mixed with a solution of 6.9 parts of sodium nitrite in 20 parts by volume of water and were diazotized as described in Example 1.

The said suspension of the diazonium salt was allowed to run, at 5–10° C., with stirring, into a solution of 30.3 parts of 2-aminonaphthalene-5,7-disulfonic acid in 200 parts of sodium hydroxide solution of 4% strength. At the same time, by dropwise addition of 4-N sodium carbonate solution, a pH of 6 was ensured. The batch was subsequently stirred for one hour and was heated to 60° C. at which temperature the azo dyestuff formed was salted out with 224 parts of sodium chloride. The precipitated azo dyestuff was suction-filtered and was washed with a sodium chloride solution of 20% strength. The filter-cake was, subsequently, stirred into 1.5 l. of water and the batch rendered alkaline with 200 parts of sodium hydroxide solution of 4% strength. It was heated to 80° C. at which temperature 190 parts of sodium hypochlorite (15% active chlorine) were allowed to run in, while vigorously stirring. Stirring was continued at 80° C. for one hour. Into the obtained yellow-brown solution 330 parts of sodium chloride were stirred at 60° C., the batch was allowed to cool to room temperature while stirring, was stirred for one hour on the ice bath, and was suction-filtered and washed with sodium chloride solution of 20% strength. After drying, the sodium salt of 4-[1'',2'',4''-triazolyl-(1'')-] - 4' - [6'' - 8''' - disulfonaphtho-(1,2-d) - triazolyl - (2''') - stilbene - 2,2' - disulfonic acid was obtained as a finely crystalline yellow powder.

EXAMPLE 6

A fabric made for polyamide-6 was heated within 30 minutes in a pressure apparatus from 40 to 120° C. in the twentyfold amount of a solution adjusted to a pH of 3.8 by means of oxalic acid and containing—referred to the weight of the goods—0.2% of the sodium salt of 4-[1'',2'',4'' - triazolyl - (1'') - ] - 4' - [6''' - sulfo-naphtho-(1,2 - d) - triazolyl - (2''') - ] - stilbene - 2,2' - disulfonic acid (No. 10, Table 1) and maintained at the said temperature for half an hour.

After cooling, washing and drying, the fabric showed an excellent degree of whiteness of a bluish fluorescence.

The sodium salt of 4[1'',2'',4'' - triazolyl-(1'')-]-4'-(6''' - sulfonaphtho - (1,2,d) - triazolyl - (2''')-]-stilbene-2,2'-disulfonic acid was obtained, analogously as the compounds described in Example 5, by diazotizing the sodium salt of 4-[1'',2'',4''-triazolyl-(1'')]-4'-aminostilbene-2,2'-disulfonic acid, coupling the diazonium salt onto 2-aminonaphthalene-5-sulfonic acid and subsequently triazolizing the o-aminoazo dyestuff with sodium hydrochlorite.

EXAMPLE 7

The sodium salt of 4,4'-bis-[1'',2'',4''-triazolyl-(1'')-]stilbene-2,2'-disulfonic acid (No. 13, Table 1) was prepared as follows:

40 parts of 4,4' - bishydrazino-stilbene-2,2'-disulfonic acid were stirred, at room temperature, into 200 parts of formamide. The mixture was heated, while stirred for one hour to 186° C. (reflux temperature of formamide), was allowed to cool, gradually, to room temperature and the formamide was distilled off in vacuo. The residue that remained behind was dissolved by heating to 90° C. in 1 liter of water and the solution was clarified with charcoal. Into the obtained clear solution 50 parts of sodium chloride were stirred at 60° C., the solution was allowed to cool to room temperature, while stirring, the precipitate suction filtered, washed with sodium chloride solution of 5% strength and dried. The sodium salt of 4,4' - bis-[1'',2'',4''-triazolyl-(1)-]-stilbene-2,2'-disulfonic acid was obtained as a finely crystalline faintly yellow powder.

EXAMPLE 8

Preparation of the sodium salt of 1,4-bis-[4'-(1,2,4)-triazolyl-(1)-2'-sulfo-styryl)-benzene 50.3 parts of 1,4 - bis-[-4'-hydrazino-2'-sulfo-styryl-]-benzene were stirred, at room temperature, into the fivefold amount of formamide. After thorough mixing, the whole was heated to 185–195° C., at which temperature the formamide boiled at reflux. After it had boiled for one hour, the reaction mixture was allowed to cool to room temperature, the yellow reaction product which precipitated in fine crystals was suction filtered, was washed with sodium chloride solution of 10% strength. For purification, the crude product was dissolved in 2500 parts by volume of a mixture of equal parts by volume of dimethylformamide and water by heating to 90° C., was clarified with charcoal and salted out, at 80° C., with 125 parts of sodium chloride. The whole was allowed to cool to room temperature, while stirred, the precipitate was suction filtered, was washed with sodium chloride solution of 10% strength and was dried in vacuo at 60° C.

After drying the sodium salt of 1,4-bis-[-4'-(1,2,4)-triazolyl - (1) - 2' - sulfo-styryl-]-benzene was obtained as a light-yellow powder of a greenish fluorescence.

EXAMPLE 9

The 4-[1'',2'',4''-triazolyl-(1'')]-4'-aminostilbene which served as starting material for the preparation of numerous stilbene derivatives of the invention which are free from sulfone groups was obtained as follows:

24 parts of 4-nitro-4'-aminostilbene were introduced with stirring into a mixture of 600 parts by volume of methanol and 600 parts by volume of water and 25 parts by volume of concentrated hydrochloric acid were added thereto. Subsequently, the mixture was heated to the boil until all ingredients went into solution, whereupon another 25 parts by volume of concentrated hydrochloric acid were added. Subsequently, the solution was cooled on the ice bath to 0–5° C. while stirring, whereby the hydrochloride of the nitro-aminostilbene precipitated in form of yellow needles. To the well-stirred hydrochloride suspension 22 parts by volume of 5-N sodium nitrite solution were added dropwise within half an hour, stirring then for 3 hours at 0–5° C. On completion of the diazotization, the excess of nitrous acid was removed with amidosulfonic acid.

Then, at 0–5° C., the suspension of the diazonium salt was added dropwise to a solution of 124 parts of tin-(II)-chloride-dihydrate in 400 parts by volume of concentrated hydrochloric acid. The addition being terminated, the ice bath was removed and the batch was stirred for 15 hours at room temperature.

For completing the reaction, the mixture was heated to the boil for half an hour and then allowed to cool to room temperature without stirring.

The precipitate was suction filtered, was freed from the tin salts by washing with half-concentrated hydrochloric acid and isopropanol and was dried. The 4-hydrazino - 4'-aminostilbene-dihydrochloride was thus obtained as a grey-beige powder.

29.8 parts of the dry product were stirred, at room temperature, into 150 parts of formamide and heated, subsequently, for one hour, to the boil. To isolate the reaction product, 300 parts by volume of water were allowed to run into the mixture starting at 150° C., the whole was boiled for a short time and, then, cooled to room temperature with stirring, the precipitated product was suction filtered and was thoroughly washed with water. The precipitated crude product was introduced, while still moist, into a mixture of 400 parts by volume of ethanol and 400 parts by volume of concentrated hydrochloric acid and heated for one hour to the boil. Then it was allowed to cool to room temperature while stirring, suction-filtered and washed with ethanol.

The resulting product was, immediately, run into a mixture of 400 parts by volume of ethanol and 400 parts by volume of water and was dissolved by stirring and heating to the boiling point. To the boiling solution 39 parts by volume of sodium hydroxide solution of 33% strength were, subsequently, added dropwise within half an hour, whereupon stirring was continued for three hours under reflux. The reaction mixture was, finally, cooled to room temperature with stirring, the precipitated product was suction-filtered and was washed neutral with water. After drying, 20.2 parts of 4-[1'',2'',4''-triazolyl-(1'')]-4'-aminostilbene were obtained as a light-yellow powder melting at 269–271° C.

EXAMPLE 10

A knit fabric made from polyamide 6 was treated on a winch beck with the twentyfold amount of a liquor containing—referred to the weight of the goods—0.2% of 4 - [1'',2'',4''-triazolyl-(1)]-4'-[5''',6'''-dimethoxy-benzo-triazolyl-(2''')]-stilbene (Table 3, No. 18), sodium carbonate for adjusting a pH of 10 and, per liter, 0.5 part of a nonylphenolpolyglycolether as washing agent. The fabric was introduced at 40° C. and the bath heated within 20 minutes to 80° C. at which temperature it was maintained for half an hour. Then the fabric was rinsed. The thus brightened material exhibited an excellent degree of whiteness of neutral shade.

The 4-[1'',2'',4''-triazolyl-(1'')]-4'-[5''',6'''-dimethoxy-benzothiazolyl-(2''')]-stilbene (Table 3, No. 18) was prepared as follows:

26.2 parts of 4-[1'',2'',4''-triazolyl-(1'')]-4'-aminostilbene were stirred into 600 parts by volume of dimethylformamide and were dissolved by heating to 60° C. While vigorously stirring, 100 parts by volume of concentrated hydrochloric acid were added dropwise and the mixture was cooled on ice to 0–5° C.

At the said temperature, while vigorously stirring, subsequently 100 parts by volume of a dilute sodium nitrite solution obtained by mixing 22 parts by volume of 5 N sodium nitrite solution with 100 parts by volume of water were dropwise added, the whole was stirred for four hours and the excess of nitrous acid was, finally, destroyed with amido-sulfonic acid.

Then, at 0–5° C., the so-obtained diazonium salt suspension was introduced, dropwise, into a solution of 15.3 parts of 4-amino-1,2-dimethoxybenzene in 200 parts by volume of pyridine and the batch was stirred for 15 hours at room temperature.

In order to isolate the azo dyestuff formed, the reaction mixture was heated to 100° C., was mixed with 550 parts by volume of water and was cooled to room temperature, while stirring. The product was suction-filtered, washed with 100 parts by volume of a mixture of equal parts by volume of dimethylformamide and water and with 250 parts by volume of water. The product was, after it had been thoroughly suction-filtered, stirred for 2 hours with 500 parts by volume of 0.2 N sodium hydrogencarbonate solution, once more suction-filtered, thoroughly washed with water and dried.

42.6 parts of the dried azo dyestuff were placed, at room temperature, into a mixture of 625 parts by volume of pyridine and 40 parts of copper-(II)-acetate. The mixture was well stirred and heated for one hour to 80° C. Then 1000 parts by volume of methanol were allowed to run in the mixture which was heated, shortly, to the boil, cooled, while stirred, on the ice bath and the product was suction-filtered and thoroughly washed, with methanol. After recrystallization from 1,2,4-trichlorobenzene, 26.3 parts of 4-[1'',2'',4''-triazolyl-(1'')]-4'-[5''',6'''-dimethoxybenzothiazolyl-2''')]-stilbene were obtained melting at 327–330° C.

EXAMPLE 11

Preparation of 4-[1'',2'',4''-triazolyl-(1'')]-4'-[5'''-methoxy - 6''' - methyl-benzothiazolyl-(2''')]-stilbene-2,2'-disulfonic acid diethylamide (Table 3, No. 20).

61.2 parts of the sodium salt of 4-[1'',2'',4''-triazolyl-(1'')] - 4' - [5'''-methoxy - 6''' - methyl-benzothiazolyl-(2''')]-stilbene-2,2'-disulfonic acid (Table 1, No. 7) were stirred at room temperature into 650 parts by volume of phosphorus oxytrichloride and the whole was mixed with 41.6 parts of phosphorus pentachloride. The batch was heated, while stirred, for 15 hours to the boil and the phosphorus oxytrichloride was removed, completely, by distillation. The residue that remained behind was well stirred in 500 parts by volume of water, while cooling with ice, suction-filtered, washed with water until neutral to congo paper and was dried in an exsiccator.

60.5 parts of the so-obtained sulfochloride were introduced, at room temperature, into 1300 parts by volume of acetone in which 21.9 parts of diethylamine had been dissolved. The whole was, subsequently, heated for one hour to the boil, whereupon, while maintaining at the boiling temperature, 650 parts by volume of water were allowed to run into the mixture. Then, while stirring, the batch was again cooled, slowly, to room temperature, the product suction-filtered, washed neutral with water and dried.

After recrystallization from n-butanol, 47.5 parts of 4-[1'',2'',4''-triazolyl-(1'')] - 4' - [5'''-methoxy-6'''-methylbenzotriazolyl-(2''')]-stilbene-2,2'-disulfonic acid diethylamide were obtained as a light-yellow powder melting at 237–238° C.

EXAMPLE 12

A fabric consisting of, at least, 85% of polyacrylonitrile was treated on a dyeing jigger, with a bleaching liquor containing per liter 3 g. of sodium chlorite as bleaching agent and 1.5 g. of sodium nitrate as anticorrosive, formic acid for adjusting a pH of 3.5 and—referred to the weight of the good–0.1% of compound 22 (Table 4).

The liquor was heated, within half an hour, to 85° C. at which temperature it was kept for another hour. Subsequently, the temperature was raised within 15 minutes to the boil, maintained so for half an hour and then the bath was slowly cooled to 50° C. reducing the temperature by about 1° C. per minute.

The so-treated fabric exhibited, after rinsing and drying an excellent degree of whiteness neutral in shade.

Compound 22 (Table 4) was prepared as follows:

41.4 parts of 4-[1,2,4-triazolyl-(1)] - 4' - [naphtho-(1,2-d)-triazolyl-(2)]-stilbene were stirred, at room temperature, into 1000 parts by volume of 1,2,4-trichlorobenzene and dissolved by heating to 150° C., at which temperature, subsequently, 21 parts by volume of dimethylsulfate were dropwise added within half an hour, whereby the quaternary product precipitated as a finely crystalline, light-yellow powder. Stirring was continued for 3 hours at 150° C., whereupon the reaction mixture was allowed to cool to room temperature while stirred. The product which precipitated was suction filtered, washed with trichlorobenzene and benzene and was dried. After drying, 53.2 parts of compound 22 were obtained as a light-yellow powder decomposing at 266–267° C.

EXAMPLE 13

A hank yarn fabric consisting of, at least, 85% of polyacrylonitrile was treated in a dyeing apparatus of known construction with a dyebath containing oxalic acid for adjusting a pH of 4 and—referred to the weight of the goods—0.1% of compound 24 (Table 4).

The bath was heated within 45 minutes from 40 to 100° C. at which temperature the fabric was treated for 45 minutes. Subsequently, the bath was, slowly, cooled to 50° C. reducing the temperature by about 1° C. per minute. After rinsing and drying, the so-treated material exhibited an excellent degree of whiteness of bluish fluorescence.

Compound 24 (Table 4) was prepared analogously as that described in Example 12, by dissolving 42.4 parts of 4-[1,2,4-triazolyl-(1)]-4'-[5,6 - dimethoxy-benzotriazolyl-(2)]-stilbene in trichlorobenzene and reacting at 170° C., with 21 parts by volume of dimethylsulfate.

After suction-filtration, washing and drying, 56 parts of a greenish-yellow powder decomposing at 284° C. were obtained. The compounds 23 or 25 (Table 4) were obtained in an analogous manner, at 150° or, respectively, 160° C., i.e. temperatures corresponding to their solubility.

TABLE 1

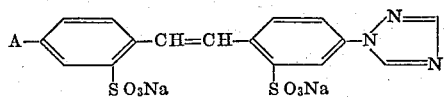

| Number | A | Absorption, $\lambda_{max}$ in m$\mu$ ($\epsilon$,10$^{-4}$) | Fluorescence |
|---|---|---|---|
| 1 | CH$_3$—CO—NH— | 338 (2.64) | Violet. |
| 2 | C$_6$H$_5$—CO—NH— | 340 (3.92) | Blue-violet. |
| 3 | CH$_3$O—C$_6$H$_4$—CO—NH— | 343 (3.96) | Do. |
| 4 | (HOCH$_2$CH$_2$)$_2$N—[triazinyl]—NH— with NH—C$_6$H$_5$ | 353 (3.56) | Blue. |
| 5 | (HOCH$_2$CH$_2$)$_2$N—[triazinyl]—NH— with NH—C$_6$H$_4$—SO$_3$Na | 350 (4.62) | Do. |
| 6 | morpholino—[triazinyl]—NH— with NH—C$_6$H$_5$ | 350 (3.55) | Do. |
| 7 | 5,6-dimethoxy-benzotriazolyl (CH$_3$O, CH$_3$) | 365 (5.86) | Reddish blue. |
| 8 | naphthotriazolyl | 361 (3.24) | Blue. |
| 9 | COONa-naphthotriazolyl | 377 (4.48) | Greenish blue. |

TABLE 1—Continued

| Number | A | Absorption, $\lambda_{max}$ in m$\mu$ ($\epsilon$,10⁻⁴) | Fluorescence |
|---|---|---|---|
| 10 |  | 370 (4.12) | Blue. |
| 11 |  | 375 (5.9) | Do. |
| 12 | 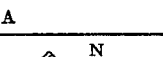 | 371 (6.14) | Do. |
| 13 |  | 328 (4.43) | Violet. |

TABLE 2

| Number | A | Absorption, $\lambda_{max}$ in m$\mu$ ($\epsilon$,10⁻⁴) | Fluorescence |
|---|---|---|---|
| 14 | $H_2N-\overset{O}{\underset{}{C}}$—⟨ ⟩—CH=CH—⟨ ⟩—N(triazole), SO₃Na | 332 (3.82) | Violet. |
| 15 | (triazole)N—⟨ ⟩—CH=CH—⟨ ⟩—[—CH=CH—⟨ ⟩—N(triazole), NaO₃S], SO₃Na | 373 (8.32) | Reddish blue. |

TABLE 3

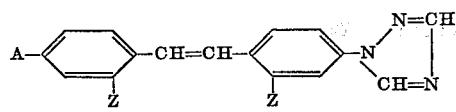

$$A-\langle\ \rangle-CH=CH-\langle\ \rangle-N\begin{matrix}N=CH\\ \\CH=N\end{matrix}$$
(with Z substituents on the phenyl rings)

| Number | A | Z | M.P., °C. | Absorption $\lambda_{max}$ in (m$\mu$) ($\epsilon$.10⁻⁴) | Fluorescence in DMF |
|---|---|---|---|---|---|
| 16 | (naphthotriazole) | H | 278–279 | 370 (7.55) | Reddish blue. |
| 17 | CH₃O, CH₃ substituted benzotriazole | H | 328–331 | 365 | Do. |

TABLE 3—Continued

| Number | A | Z | M.P. °C. | Absorption $\lambda_{max}$ in m$\mu$ ($\epsilon$,$10^{-4}$) | Fluorescence in DMF |
|---|---|---|---|---|---|
| 18 | CH₃O-/CH₃O- (benzotriazole) | H | 327–330 | 368 | Reddish blue. |
| 19 | (acenaphtho-triazole) | H | 278–280 | 376 | Do. |
| 20 | CH₃O-/CH₃- (benzotriazole) | —SO₂N(C₂H₅)₂ | 237–238 | 362 (6.41) | Do. |
| 21 | Same as above | —SO₂N(piperidine) | 297–299 | 362 (6.21) | Do. |

TABLE 4

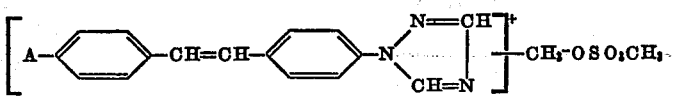

| Number | A | Decomposition point, °C. | Absorption $\lambda_{max}$ in m$\mu$ ($\epsilon$,$10^{-4}$) | Fluorescence in dimethyl-formamide |
|---|---|---|---|---|
| 22 | (naphthotriazole) | 266–267 | 369 (7.39) | Reddish blue. |
| 23 | (acenaphthotriazole) | 290–291 | ¹376 | Greenish blue. |
| 24 | CH₃O-/CH₃O- (benzotriazole) | 278 | 365 (6.44) | Do. |
| 25 | CH₃O-/CH₃- (benzotriazole) | 284 | 369 (7.22) | Reddish blue. |

¹ Too difficultly soluble.

We claim:
1. A compound of the formula

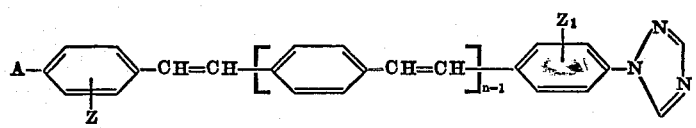

in which A is hydrogen, halogen, lower alkoxy, cyano, carboxy, amido, acetylamino, phenylacetylamino, benzoylamino, mono- or di-methoxybenzoylamino, 1,2,4-triazol-ly-(1), $$\begin{array}{c} X \\ | \\ N{\nwarrow}{\diagup}N \\ \phantom{N}|\phantom{N}{\diagdown}NH- \\ N{\diagup}{\searrow}N \\ | \\ Y \end{array}$$

in which X and Y are chlorine, amino, lower alkoxy, lower alkyl amino, lower hydroxyalkyl amino, di-(lower alkyl)-amino, di-(lower-hydroxyalkyl)-amine, anilino, sulfo-anilino, piperidino or morpholino (structure with $U_1, U_2, U_3, U_4$ on benzimidazole ring)

in which $U_1$ and $U_4$ are hydrogen or carboxy, $U_2$ is hydrogen, lower alkyl or lower alkoxy, $U_3$ is lower alkyl or lower alkoxy, and $U_2$ and $U_3$ together stand for methylenedioxy, or (two naphtho-imidazole structures) or unsubstituted or substituted by one or two —SO₃Na or —COONa substituents, Z and $Z_1$ are hydrogen, sulfo, carboxy, di-lower alkyl sulfonamido or piperidyl sulfonamido and $n$ is 1 or 2, and the quaternization products thereof.

2. The compound as defined in claim 1, wherein Z and $Z_1$ are identical.

3. The compound as defined in claim 1, wherein A is a group of the formula (structures with $U_2$, $CH_3$ substituents) or (naphtho structure)

in which $U_2$ is hydrogen or methoxy and the annulated benzene ring is unsubstituted or substituted by one or two sulfo groups, Z and $Z_1$ are sulfo groups and $n$ is 1.

4. The compound as defined in claim 1, wherein Z and $Z_1$ are sulfo groups.

5. A methosulfate of the compound as defined in claim 1, wherein Z and $Z_1$ are hydrogen.

6. A methosulfate of the compound defined in claim 1, wherein A stands for a group of the formula (three structures)

$U_2$ is hydrogen or methoxy, $U_3$ is methyl or methoxy, Z and $Z_1$ are hydrogen, and $n$ is 1.

7. The compound as claimed in claim 1, wherein A is a group of the formula (structure with —OCH₃ and —CH₃ substituents)

Z and $Z_1$ are sulfo and $n$ is 1.

8. The methosulfate of a compound as claimed in claim 1, wherein A is a group of the formula (naphtho-imidazole structure)

Z and $Z_1$ are hydrogen and $n$ is 1.

9. The methosulfate of a compound as claimed in claim 1, wherein A is a group of the formula (acenaphtho-imidazole structure)

Z and $Z_1$ are hydrogen and $n$ is 1.

10. The methosulfate of a compound as claimed in claim 1, wherein A is a group of the formula (structure with two —OCH₃ substituents)

Z and $Z_1$ are hydrogen and $n$ is 1.

11. The methosulfate of a compound as claimed in claim 1, wherein A is a group of the formula (structure with —OCH₃ and —CH₃ substituents)

Z and $Z_1$ are hydrogen and $n$ is 1.

References Cited

UNITED STATES PATENTS 3,511,834    5/1970    Siegrist et al. .......... 260—240

HENRY R. JILES, Primary Examiner

G. T. TODD, Assistant Examiner

U.S. Cl. X.R.

106—193; 117—33.5 R; 252—301.2 W; 260—37 N, 240 A, 240 D, 240.9